United States Patent [19]

Hasegawa et al.

[11] Patent Number: 4,846,649

[45] Date of Patent: Jul. 11, 1989

[54] CENTER MECHANISM IN TIRE VULCANIZING MACHINE

[75] Inventors: Akira Hasegawa; Katsuyoshi Sakaguchi; Hideaki Katayama, all of Nagasaki, Japan

[73] Assignee: Mitsubishi Jukogyo Kabushiki Kaisha, Tokyo, Japan

[21] Appl. No.: 172,372

[22] Filed: Mar. 24, 1988

[30] Foreign Application Priority Data

May 13, 1987 [JP] Japan ................ 62-116643

[51] Int. Cl.[4] ............................................. B29C 33/04
[52] U.S. Cl. ..................................... 425/33; 425/44; 425/51; 425/58
[58] Field of Search ................. 425/33, 44, 51, 58

[56] References Cited

U.S. PATENT DOCUMENTS

| | | | |
|---|---|---|---|
| 2,564,662 | 8/1951 | Baker | 425/51 |
| 3,113,344 | 12/1963 | Frohlich et al. | 425/44 |
| 3,793,420 | 2/1974 | Fredricks et al. | 425/58 |
| 4,368,015 | 1/1983 | Kawahara et al. | 425/29 |
| 4,527,946 | 7/1985 | Singh et al. | 425/33 |
| 4,684,338 | 8/1987 | Steidl et al. | 425/33 |
| 4,698,003 | 10/1987 | Singh | 425/58 |

Primary Examiner—Willard E. Hoag
Attorney, Agent, or Firm—Bernard, Rothwell & Brown

[57] ABSTRACT

The known center mechanism in a tire vulcanizing machine is improved in that the center mechanism comprises condensate ejection means which can be accommodated within a member disposed in the center mechanism and which can be moved between the member and a condensate stagnating portion, a sleeve movable vertically within an upper ring by an operation of a pneumatic cylinder and adapted to be engaged with a part of the upper ring at its end portion to restrain a raised position of the upper ring, whose fixed height with respect to a rod of the pneumatic cylinder is variable, and a rotary member for restraining the position of the lower ring, whose engagement length with a receiving plate for the lower ring can be varied by continuous rotation thereof, and which can be fitted to and disengaged from a support member therefor through rotation by a predetermined amount.

4 Claims, 4 Drawing Sheets

CENTER MECHANISM IN TIRE VULCANIZING MACHINE

BACKGROUND OF THE INVENTION

1. Field of the Invention

The present invention relates to a center mechanism in a tire vulcanizing machine provided with a drain ejection mechanism, an upper ring position setting mechanism and a lower ring position setting mechanism.

2. Description of the Prior Art

In a tire vulcanizing machine in the prior art, an ejection mechanism for a drain condensate accumulated at a lower portion of a bladder upon vulcanization was not provided, and upon setting of an upper ring position a hydraulic cylinder was used, various kinds of spacers were prepared, and opening, assembling and reconstruction of devices were effected. Furthermore, in the prior art, fitting and disengagement of a stopper and level adjustment for a lower ring were performed respectively by making use of separate mechanisms.

The above-mentioned type of tire vulcanizing machines in the prior art involved the following problems to be resolved:

(1) In the past, hot water was used in the case of vulcanizing a tire, but in recent years, gas vulcanization in which after heating by steam, pressurizing is effected by means of an inert gas, has become to be practiced. In that case, condensate would be accumulated at a lower portion of a bladder, hence there occurred the problem that a tire was vulcanized at an uneven temperature, and in order to obviate this problem, ejection of condensate was necessitated.

(2) While setting of an upper ring position upon shaping is very important for improving quality of a tire, in order to utilize a hydraulic pressure upon the setting a corresponding equipment becomes necessary and a cost of used instruments becomes high. Hence, an easily adjustable mechanism which can achieve a similar function to that described above by making use of a pneumatic cylinder, is necessitated.

(3) In the prior art, a spacer or the like was inserted to match the lower ring position with the lower metal mold, hence a large number of spacers were necessary, and for mounting the spacer a lot of human labor and time were necessitated.

SUMMARY OF THE INVENTION

It is therefore a principal object of the present invention to provide a novel center mechanism in a tire vulcanizing machine in which the above-described problems in the prior art have been entirely resolved.

According to one feature of the present invention, there is provided a center mechanism in a tire vulcanizing machine, comprising condensate ejection means which can be accommodated within a member disposed in the center mechanism, a sleeve movable vertically within an upper ring by an operation of a pneumatic cylinder and adapted to be engaged with a part of the upper ring at its end portion to restrain a raised position of the upper ring, whose fixed height with respect to a rod of the pneumatic cylinder is variable, and a rotary member for restraining the position of the lower ring, whose engagement length with a receiving plate for the lower ring can be varied by continuous rotation thereof, and which can be fitted to and disengaged from a support member therefor through rotation by a predetermined amount.

The above-featured center mechanism in a tire vulcanizing machine operates in the following manner:

(1) In the case where the above-mentioned condensate ejection means is, for instance, a tube forming a condensate ejection passageway, the tube is curved and is normally accommodated within the lower ring so that it may not interfere the operation of the bladder, but upon vulcanizing a tire, it is subjected to the operations of rising→revolving→lowering, thereby an ejection nozzle portion thereof is brought close to the bottom position within the bladder, and condensate in that bottom portion is ejected through the tube.

(2) Upon setting the position of the upper ring, owing to the fact that a sleeve whose mounting position with respect to the rod of the pneumatic cylinder is adjustable, is provided at a position where an adjusting work can be done easily, the position setting can be achieved easily in a short period of time. Furthermore, by employing a special tool, the position of the abovementioned sleeve can be adjusted safely without any difficulty even during operation at a high temperature.

(3) During operation, by rotating the rotary member by 90° in the necessary direction, fitting and disengagement between the rotary member and its support member are effected to carry out preparation or vulcanization of a tire, and upon adjustment of the lower ring position, by continuously rotating the rotary member the engagement length with the receiving plate for the lower ring is adjusted, and thereby the level of the lower ring can be set. For the rotations of the rotary member for the above-mentioned fitting and disengagement and for the adjustment of the engagement length, a same drive source is used in common.

According to the present invention, the following advantages are obtained:

(1) A mechanical type of condensate ejection means which was considered to be impracticable in the prior art, can be realized.

(2) The height of the upper ring upon shaping can be easily adjusted by means of the sleeve even during operation, and also, since many spacers are not necessitated as is the case with the prior art and a pneumatic cylinder can be employed, the subject center mechanism is economical.

(3) The two operations of fitting and disengaging a positioning member to and from a support member therefor and adjusting the height of the lower ring can be achieved by making use of a single drive source, especially the height adjustment among these operations can be automated, and therefore, an adjusting time can be shortened.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings

DESCRIPTION OF THE PREFERRED EMBODIMENT

Figure 1:
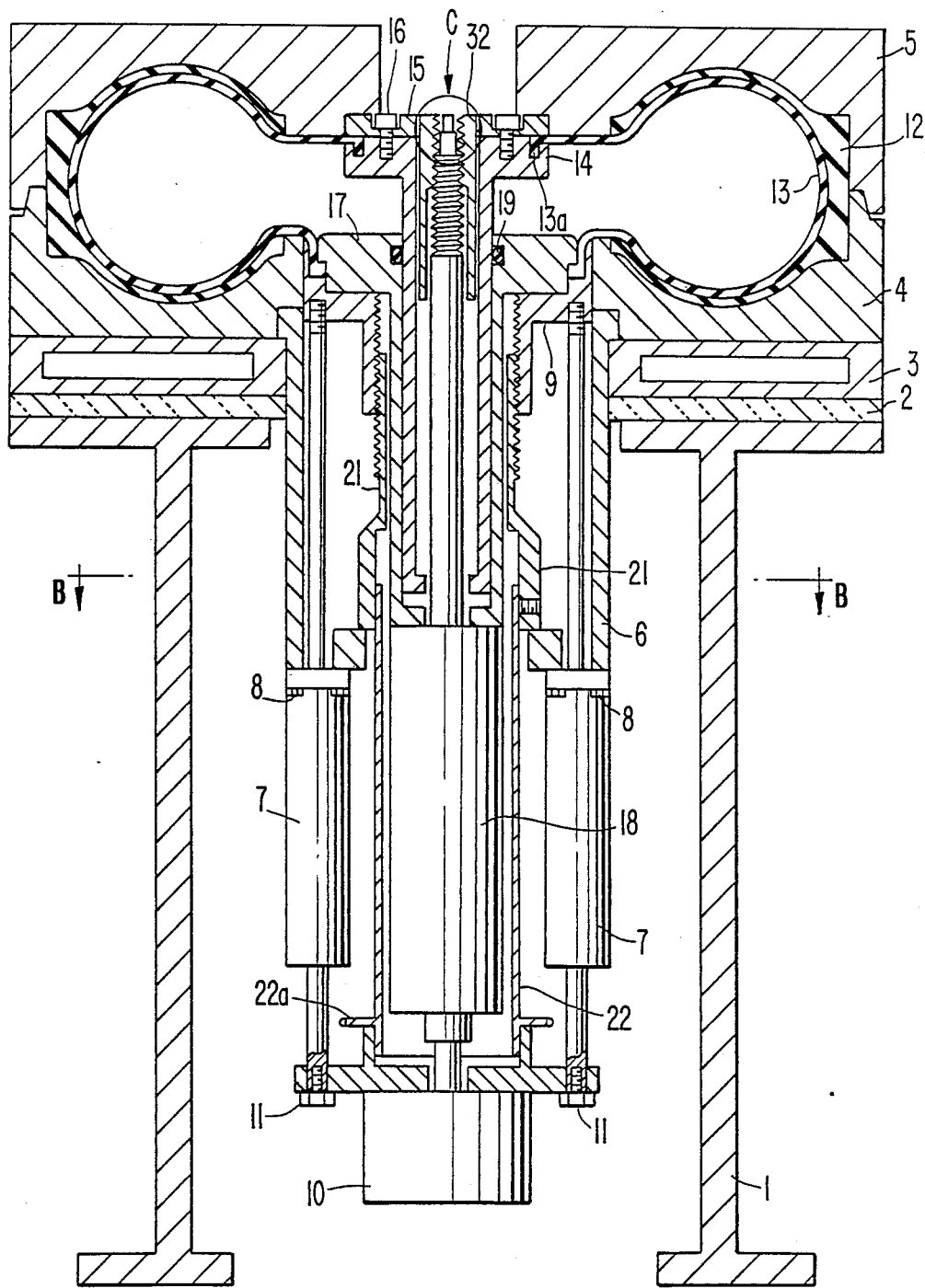
FIG. 1 is a longitudinal cross-section front view of a center mechanism in a vulcanizing machine according to one preferred embodiment of the present invention.
Figure 2:
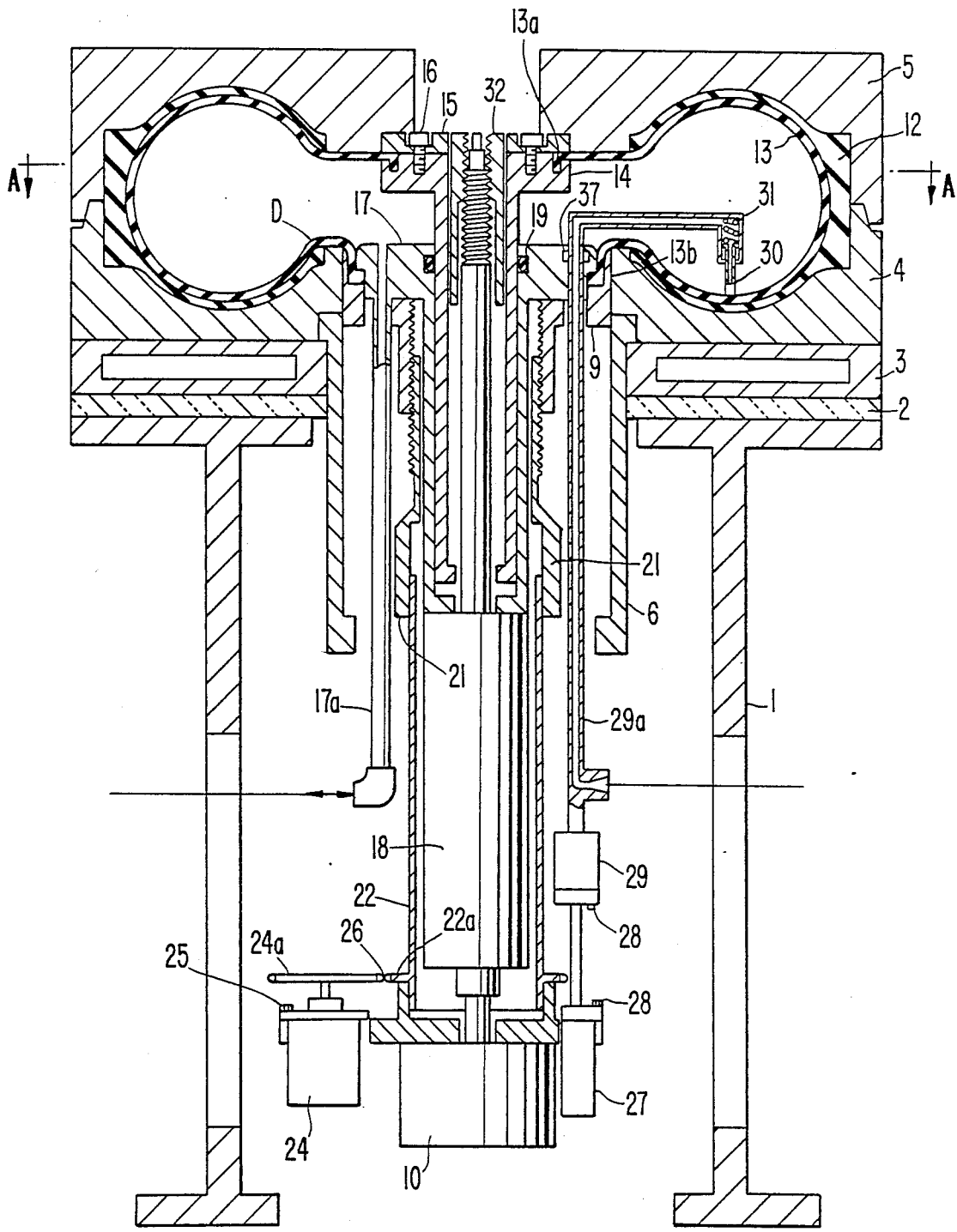
FIG. 2 is a longitudinal cross-section side view of the same center mechanism.

Referring now to FIGS. 1 and 2, on a base 1 is fixedly secured a lower heater panel 3 via a heat-insulating plate 2 by means of bolts or the like not shown.

A lower metal mold 4 is fixedly secured onto the aforementioned lower heater panel 3 by means of bolts or the like not shown. An upper metal mold 5 is subjected, jointly with the lower metal mold 4 to a compression action by means of a pressing mechanism not shown.

An outer cylinder 6 has its upper flange supported from the lower heater panel 3 and its outer surface loosely mated with an inner surface of the lower heater panel 3. The bottom of the outer cylinder 6 is formed in a flat plate shape in which a necessary number of holes of desired sizes are opened, and onto the lower surface of the flat plate portion are fixedly sucured two sets of hydraulic cylinders 7 by means of bolts 8. A threaded portion of a tip end of an upper side rod of the hydraulic cylinder 7 is threadedly coupled to a receiving plate 9 which receives a lower end portion of a bladder 13. In addition, at the tip end of a lower side rod of the hydraulic cylinder 7 is threaded a female screw to be fixedly secured to a flange of a hydraulic cylinder 10 by means of bolts 11. Here it is to be noted that the hydraulic cylinder 7 is the so-called "double rod type" hydraulic cylinder, in which the upper side rod and the lower side rod are integrally formed and extend through the interior of the cylinder. A tire 12 is mounted on the inner surfaces of the upper and lower metal molds 5 and 4, and a bladder 13 is mounted on the inner surface of the tire 12. A rib 13a provided at the upper side edge of the bladder 13 as directed inwards is pinched between an upper ring 14 and a bladder press member 15, and they are fixed to each other by means of bolts 16.

The upper ring 14 has its upper portion formed in a doughnut type disc shape and has its lower portion formed in a cylindrical shape, at the bottom of the cylindrical portion is provided a claw 14a adapted to butt against the bottom surface of a sleeve as will be described later, and the cylindrical portion is loosely mated with the cylindrical inner surface of the lower ring 17.

At the bottom end of the lower ring 17 is provided an inwardly directed flange, and a pneumatic cylinder 18 is fixedly secured thereto by means of bolts or the like not shown. At the tip end portion of the rod of the pneumatic cylinder 18 is machined a male screw, and a sleeve 32 is threadedly mated with this male screw and loosely mated with a cylindrical inner surface of the upper ring 14. In addition, at the bottom of the pneumatic cylinder 18 is threaded a female screw, which is threadedly engaged with a screw provided at the tip end of the rod of the above-described hydraulic cylinder 10. Reference numeral 19 designates a seal member mounted in an annular groove provided on the lower ring 17 for liquid-tightly sealing the gap between the upper ring 14 and the lower ring 17. At the lower side edge of the bladder 13 is provided an inwardly directed rib 13b, which is pinched between a receiving plate 9 formed in a shape adapted thereto and the lower ring 17 by applying a downward force of the hydraulic cylinder 10 to the lower ring 17. A lower portion of the receiving plate 9 is formed in a cylindrical shape, whose entire inner surface is machined a female screw, and a cylindrical stopper 21 having threads to be mated with this female screw is threadedly inserted into the cylindrical portion of the receiving plate 9.

A pair of claws are projected from the outside of the lower end portion of the stopper 21 with a phase difference of 180° from each other, and a rotary cylinder 22 adapted to be loosely mated with an inner surface of the lower end portion of the stopper 21 is inserted into the stopper 21. At the bottom of the rotary cylinder 22 is integrally formed a sprocket 22a, and the outer surface of the bottom portion of this rotary cylinder 22 is loosely mated with an inner surface of a cylindrical portion formed integrally with the flange of the hydraulic cylinder 10. A guide screw 23 has its screw portion threadedly fixed to a part of the inner surface of the bottom portion of the above-described cylindrical stopper 21, and has its projecting tip portion loosely fitted in a guide slot formed in the upper portion of the rotary cylinder 22, thereby rotation of the rotary cylinder 22 can be transmitted to the stopper 21 via the engagement between the above-mentioned guide slot and the guide screw 23, and at the same time the screw can slide vertically along the above-mentioned guide slot in accordance with vertical movement of the stopper.

Two pipes 17a, 17a (FIGS. 2 and 5) provided as suspended integrally from the bottom surface of the top flat plate portion of the lower ring 17 are an inlet and an outlet of a vulcanizing medium.

To the flange of the hydraulic cylinder 10 is further fixed a rotary driving device 24 by means of bolts 25, at the tip end of an output shaft of the driving device 24 is fixed a sprocket 24a which is coupled to the sprocket 22a of the rotary cylinder 22 via a roller chain 26. In addition, another hydraulic cylinder 27 is also fixedly secured to the same flange by means of bolts 28, and a rotary cylinder 29 is fixedly secured to a flange at the tip end of the rod of this hydraulic cylinder 27 by means of bolts 28.

A drain condensate ejection tube 29a formed integrally with the rod of the same rotary cylinder 29 is provided with a condensate passageway at its interior, a condensate ejection port is provided at the bottom of the condensate ejection tube 29a, the top portion of the tube 29a is bent at a right angle, its extremal end portion is further bent downwards, a nozzle 30 is loosely fitted within that portion, and this nozzle 30 projects out of the tube as applied with a resilient force of a spring 31 fixed in the tube portion. The nozzle 30 is cylindrical, and a water passing groove is provided at its bottom end. Reference numeral 37 designates a seal member mounted in an annular groove in the lower ring 17 for the purpose of maintaining liquid-tightness between the lower ring 17 and the condensate ejection tube 29a.

Figure 3:
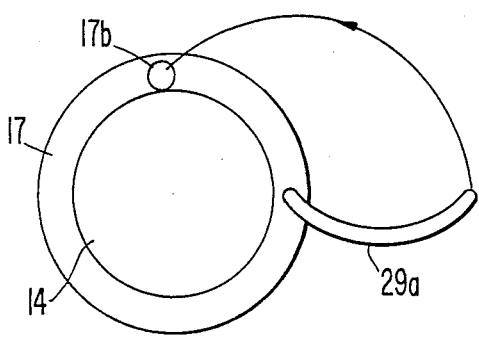
FIGS. 3 and 4 are partial transverse cross-section views taken along line A—A in FIG. 2 as viewed in the direction of arrows, FIG. 3 showing the state where a condensate ejection tube is projected from a lower ring for ejecting condensate within a bladder, and FIG. 4 showing the state where the condensate ejection tube is accommodated within the same lower ring.
Figure 4:
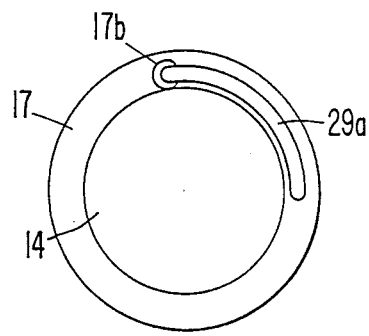

FIG. 3 shows the state where the condensate ejection tube 29a has been rotationally moved to a predetermined position, while FIG. 4 shows the state where the condensate ejection tube 29a has been accommodated within the lower ring 17. In these figures, reference numeral 17b designates a hole formed on the top surface of the upper ring 17 for the purpose of accommodating the portion of the nozzle 30.

Figure 5:
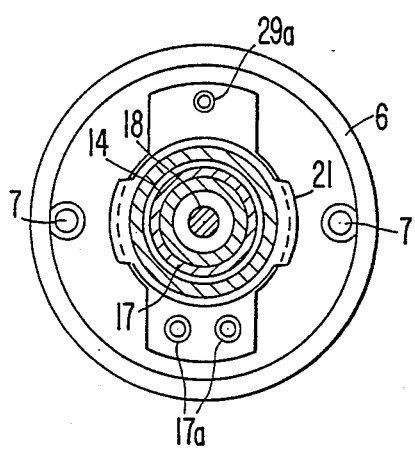
FIG. 5 is a partial transverse cross-section view taken along line B—B in FIG. 1 as viewed in the direction of arrows.

As shown in FIG. 5, an opening for allowing the pair of claws of the stopper 21 to pass therethrough is formed in the bottom wall of the outer cylinder 6, and the opening employs such hole configuration that if the stopper 21 is rotated by 90°, the claws can pass through the above-mentioned opening formed in the bottom wall of the outer cylinder 6.

Figure 6:
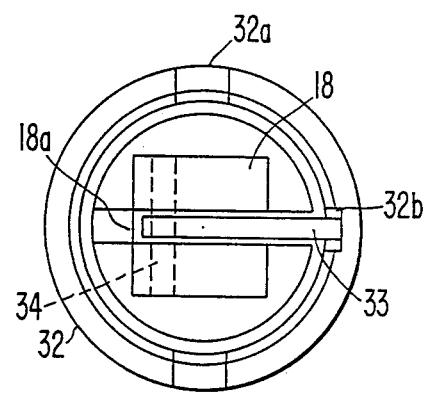
FIG. 6 is an enlarged partial plan view of the encircled portion C in FIG. 1.
Figure 7:
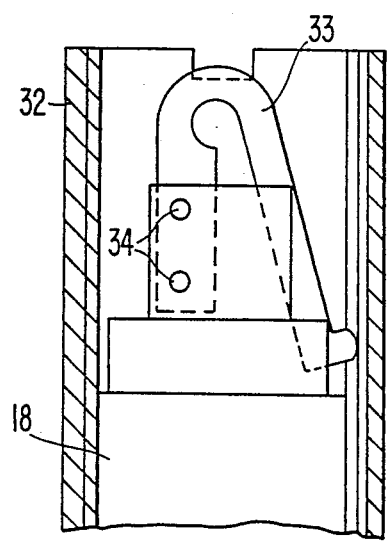
FIG. 7 is a longitudinal cross-section view of the same portion C.

As shown in greater detail in FIGS. 6 and 7, the sleeve 32 has a cylindrical shape, two grooves 32a are formed on its top surface, female threads of a necessary dimension are machined on its inner surface, and further a groove 32b directed in the axial direction is machined on its inner surface. On the other hand, the tip end of the rod of the pneumatic cylinder 18 is formed in a square pillar shape, a groove 18a is provided across the center of its top surface, threads adapted to the female threads machined on the inner surface of the above-mentioned sleeve 32 are formed on the outer circumference of the rod below the square-pillar-shaped portion, and the sleeve 32 is rotatably fitted around the threads. One end of a U-shaped leaf spring 33 is fixed in the above-described groove 18a by means of pins 34, and its free end is held in resilient contact with the bottom of the groove 32b formed on the inner surface of the sleeve 32.

Figure 8:
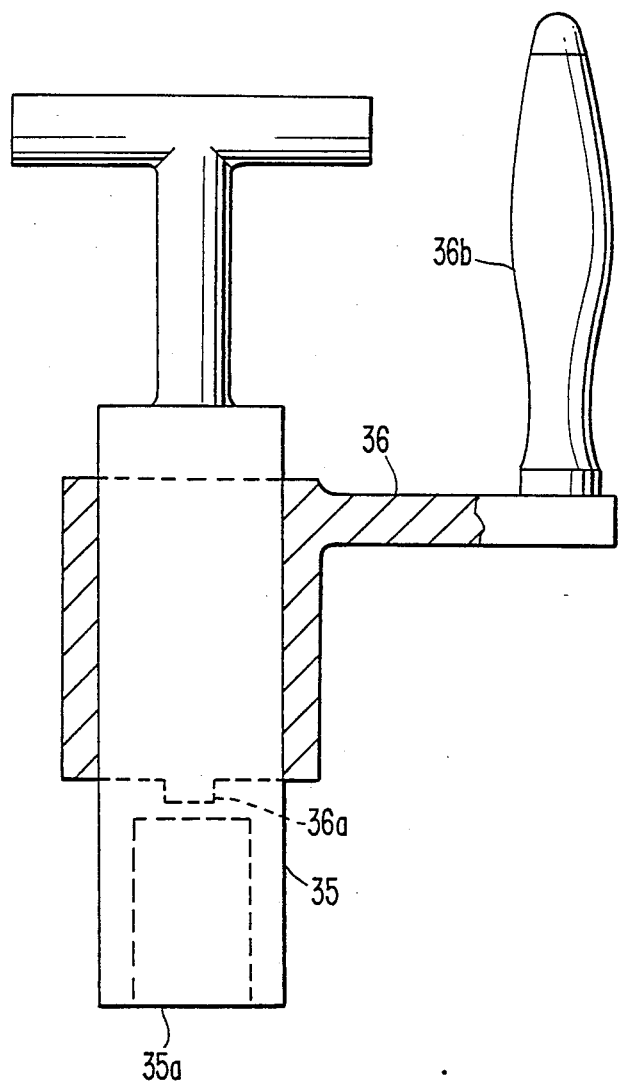
FIG. 8 is a side view partly cut away of a tool for use in adjustment of the upper ring position.

As shown in FIG. 8, a special tool 20 consists of a square box spanner 35 and a groove spanner 36, the top end of the square box spanner is formed as a handle, and at the bottom thereof is formed a square bore 35a adapted to the square pillar at the tip end of the rod of the pneumatic cylinder 18. The inner surface of the groove spanner 36 is loosely mated with the outer surface of the square box spanner 35, on the bottom surface of the groove spanner 36 are provided claws 36a at two diametrically opposed positions, and a handle 36b is integrally formed at the top of the groove spanner 36.

Now description will be made on the operations of the above-described center mechanism in a tire vulcanizing machine.

Operation-(1)

Assuming that FIGS. 1 and 2 are longitudinal cross-section views of a necessary portion in a tire vulcanizing machine which has finished heating by means of steam or the like and which is in a pressing operation by means of an inert gas, generally a condensate accumulated in the bladder 13 up to a level D (FIG. 2) is impossible to be ejected through the pipes 17a which serve as an inlet and an outlet of a vulcanizing medium, but by bringing the nozzle 30 into contact with the lowermost portion of the bladder 13, the condensate can be ejected to the outside through the interior of the condensate ejection tube 29a with the aid of the pressure within the bladder 13. If a drain trap or the like is provided at the outlet of the drain ejection tube 29a, the condensate could be ejected more effectively. If vulcanization of the tire 12 has been completed, the inner pressure is reduced and simultaneously the hydraulic cylinder 27 is actuated upwards, then after the rotary cylinder 29 has been rotated, the hydraulic cylinder is actuated downwards. At this moment, the nozzle portion of the condensate ejection tube 29a is fitted into the hole 17b provided in the lower ring 17, and so, the condensate ejection tube 29a would not interfere the subsequent work of taking out the tire at all.

Subsequently, after the hydraulic cylinder 7 has been actuated a little upwards, the stopper 21 is rotated by 90° jointly with the rotary cylinder 22 by the action of the rotary driving device 24. Thereafter, if the pneumatic cylinder 18 is actuated downwards and the hydraulic cylinder 7 is also actuated downwards, then the bladder can be accommodated within the outer cylinder 6, and the tire 12 becomes ready to be taken out. With regard to the take-out operation for the tire 12, it is similar to the conventional process, and therefore, with respect to the process for its take-out, further explanation will be omitted here.

Then, after a new green tire has been received, the next vulcanization process starts, and with regard to the manipulation of the drain ejection tube 29a, it is only necessary to carry out the manipulation in the reversed sequence to that described above.

Operation-(2)

Upon vulcanization of a tire, as a preliminary step for the vulcanization, preliminary inflation of a green tire by means of low-pressure steam called "shaping" is effected, and at this time it becomes possible to attain an always constant shaping position by maintaining the bottom surface of the sleeve 32 to butt against the claw 14a at the bottom of the upper ring 14 with the aid of the upward force exerted upon the upper ring 14 due to the inner pressure in the green tire.

Now description will be made on the method of adjustment of the sleeve 32 with reference to FIGS. 6 to 8. If the square bore 35a of the square box spanner 35 is fitted to the tip end of the rod of the pneumatic cylinder 18, then the leaf spring 33 contracts and it is released from the groove 32b. Thereafter, when the claws 36a of the groove spanner 36 are inserted into the grooves 32a and the handle 36b is rotated in the desired direction, the sleeve 32 rotates, and thereby the height of the threaded engagement of the sleeve 32 with respect to the rod can be set at a desired height. After this setting has been finished, if the square box spanner 35 is disengaged from the rod of the pneumatic cylinder 18, the adjustment is completed.

If the mating position between the groove 32b and the leaf spring 33 and a scale in the direction of height are marked on the outer surface of the square box spanner 35, it will be more convenient.

Operation-(3)

In the case where the height of the lower ring 17 is varied so as to match with the height of the lower metal mold 4, after the hydraulic cylinder 7 has been actuated upwards by a necessary amount, that is, after the receiving plate 9 and the lower ring 17 have been moved upwards by a predetermined amount, if the rotary driving device 24 is continuously rotated in the necessary direction by a predetermined amount, then the stopper 21 is rotated via the rotary cylinder 22, thereby the relative positioning in the axial direction between the stopper 21 and the receiving plate 9 is varied due to the thread engagement between the outer circumference of the stopper and the inner circumference of the receiving plate 9, and thus setting of the height of the lower ring 17 becomes possible.

As described in detail above, according to the present invention, the following advantages are obtained:

(1) A mechanical type of condensate ejection means, which was considered to be impracticable in the prior art, can be realized.

(2) The height of the upper ring upon shaping can be easily adjusted by means of the sleeve even during operation, and also, since many spacers are not necessitated as is the case with the prior art and a pneumatic cylinder can be employed, the subject center mechanism is economical.

(3) The two operations of fitting and disengaging a position member to and from a support member therefor and adjusting the height of the lower ring can be achieved by making use of a single drive source, especially the height adjustment among these operations can be automated, and therefore, an adjusting time can be shortened.

Since many changes and modifications can be made to the above-described construction without departing from the spirit of the present invention, it is intended that all matter contained in the above description and illustrated in the accompanying drawings shall be interpreted to be illustrative and not in a limiting sense.

What is claimed is:

1. A center mechanism in a tire vulcanizing machine, comprising condensate ejection means which can be accommodated within a member disposed in said center mechanism and which can be moved between said member and a condensate stagnating portion, a sleeve movable vertically within an upper ring by an operation of a pneumatic cylinder engageable with a part of the upper ring at its end portion to restrain a raised position of the upper ring, whose height with respect to a rod of the pneumatic cylinder is variable, and a rotary member for restraining the position of the lower ring, whose engagement length with a receiving plate for the lower ring can be varied by continuous rotation thereof, and which can be fitted to and disengaged from a support member therefor through rotation by a predetermined amount.

2. A center mechanism in a tire vulcanizing machine as claimed in claim 1, wherein said condensate ejection means includes a condensation ejection pipe which penetrates through the lower ring holding a bladder and which can revolve above the condensation stagnating portion within the bladder and above the lower ring.

3. A center mechanism in a tire vulcanizing machine as claimed in claim 1, wherein said sleeve is threadedly engaged with the rod of the pneumatic cylinder.

4. A center mechanism in a tire vulcanizing machine as claimed in claim 1, wherein said rotary member for restraining the position of the lower ring includes a stopper which is threadedly engaged with the receiving plate for the lower ring and adapted to be rotated by said rotary member.

* * * * *

UNITED STATES PATENT AND TRADEMARK OFFICE
CERTIFICATE OF CORRECTION

PATENT NO. : 4,846,649

DATED : July 11, 1989

INVENTOR(S) : AKIRA HASEGAWA ET AL.

It is certified that error appears in the above-identified patent and that said Letters Patent is hereby corrected as shown below:

Col. 5, line 61, "drain" should be --condensate--;
Col. 5, line 62, "drain" should be --condensate--.

Signed and Sealed this

Second Day of October, 1990

Attest:

HARRY F. MANBECK, JR.

*Attesting Officer*   *Commissioner of Patents and Trademarks*